3,110,711
PROCESS OF PRODUCING TWO ESCIN ISOMERS FROM HORSE CHESTNUT EXTRACTS, AND PRODUCTS
Josef Wagner and Joachim Bosse, both of Munich, Germany, assignors to Chemisch-Pharmazeutische Fabrik Adolf Klinge & Co., Munich, Germany, a corporation of Germany
No Drawing. Filed June 13, 1961, Ser. No. 133,003
Claims priority, application Germany June 14, 1960
11 Claims. (Cl. 260—210.5)

The present invention relates to a process of separating two isomers of escin and more particularly to the separation of the two escin isomers present in genuine escin obtained from horse chestnut extracts.

It is known to produce a crystalline water insoluble saponin of high hemolytic activity in a yield of 2% to 2.5% from an aqueous horse chestnut extract in an acid medium. This known process consists in treating the horse chestnut extract with an acid at a pH of 2.0 while heating or, respectively, in treating horse chestnut extracts with cation exchange agents. However, the resulting escin compound is obtained in a rather impure form.

It is one object of the present invention to provide a simple and effective process of separating the genuine escin obtained from horse chestnut extracts and especially from extracts of seeds of the horse chestnut tree into two isomeric compounds and to isolate said isomers in a substantially pure form.

Another object of the present invention is to provide substantially pure escin isomers of advantageous properties.

Other objects of the present invention and advantageous features thereof will become apparent as the description proceeds.

In principle, the process according to the present invention consists in splitting genuine escin obtained from horse chestnut extracts and especially from extracts of horse chestnut seeds into two isomers by converting said escin into the free acid form, for instance, by treating the same with a cation exchange agent and heating the resulting acid effluent solution to a temperature between about 50° C. and about 90° C. and preferably to a temperature between about 60° C. and about 85° C. until the one of the escin isomers, i.e. the escin which has a relatively low solubility in water is precipitated. The most suitable temperature for causing precipitation of the difficultly soluble $\beta$-escin is a temperature between about 65° C. and about 75° C. Precipitation of $\beta$-escin takes place within a relatively short period of time, for instance, within about 20 minutes. The other isomer, $\alpha$-escin, remains in solution. In this manner the two isomers can readily be separated from each other.

It is, of course, also possible to cause such separation of the two isomers by a treatment at a lower temperature, for instance, at room temperature. However, at such a low temperature a relatively long period of time is required in order to cause complete separation of the two isomers.

The preferred starting material for producing such substantially pure $\alpha$-escin and $\beta$-escin is the genuine escin isolated from the adduct of cholesterol and saponin which has been freed from other saponins.

According to the present invention said known cholesterol-saponin adduct from horse chestnut extracts is obtained by treating an aqueous or aqueous-alcoholic horse chestnut extract, especially an extract of horse chestnut seeds with cholesterol which may be added as such, i.e. in solid form or in solution and separating the resulting precipitate. By treating said adduct with ether, a pure undecomposed, genuine escin is isolated in a good yield.

$\alpha$-Escin which remains in solution on heating the acid solution of the free acid escin obtained when genuine escin is treated with a cation exchange agent is less hemolytically effective than $\beta$-escin. Its hemolytic index is 1:20,000. Thus it is especially useful in all those therapeutic applications of escin in which the hemolytic activity should be as low as possible, for instance, when injecting escin into the blood stream.

If it is of no importance whether the hemolytic activity is low, any desired amount of $\beta$-escin which has a hemolytic index of 1:40,000, may be added to the $\alpha$-escin. Of course, the hemolytic index of the mixture is increased thereby because $\beta$-escin, as has been stated above, is highly hemolytically effective.

$\alpha$- and $\beta$-escin do not differ in their molecular composition from genuine escin. They are, however, different with respect to their melting point, their solubility, their optical rotation, and their hemolytic index.

Since the separation of these two isomers proceeds quantitatively, a yield of about 4% of $\alpha$-escin and about 4% of $\beta$-escin is obtained, calculated for the starting horse chestnut extract.

$\alpha$-Escin represents a white, amorphous powder of the melting point 225–227° C. The melting point of its sodium salt is 250–252° C. Its optical rotation $[\alpha]_D^{25}$ $=-13.5°$ (concentration: 5% is absolute methanol). Its hemolytic index, as stated above, is 1:20,000. It is readily soluble in water and methanol, only slightly soluble in acetone, and insoluble in ether and hydrocarbons.

$\beta$-Escin represents white, leaflet-like crystals which have a melting point of 222–223° C., on recrystallisation from aqueous ethanol. The melting point of its sodium salt is 250–252° C. Its optical rotation $[\alpha]_D^{25}=-23.7°$ (concentration: 5% in absolute methanol). Its hemolytic index is 1:40,000. It is readily soluble in methanol, slightly soluble in acetone, very little soluble in water, and insoluble in ether and hydrocarbons.

By the addition of equivalent amounts of sodium hydroxide, the sodium salts of said two isomers can be prepared. They are readily soluble in water. Qualitatively, the two isomers have the same pharmacological properties as the starting genuine escin. They differ therefrom quantitatively in their activity. Thus, the hemolytic index of escin is about 1:30,000 while that of $\alpha$-escin, as stated above, is 1:20,000 and that of $\beta$-escin is 1:40,000.

The following examples serve to illustrate the present invention without, however, limiting the same thereto.

*Example 1*

100 g. of the sodium salt of genuine escin, are dissolved in 2 l. of water. The solution is passed through 200 cc. of a cation exchange agent sold under the trademark "Dowex 50x-4" which is a styrene cation exchange resin containing about 4% of divinyl benzene. The acid effluent is heated to 80° C. As soon as a temperature of 60° has been attained, precipitation takes place which is completed at 80° C. within about 15 minutes. The precipitated $\beta$-escin is separated from the solution containing $\alpha$-escin by centrifuging or filtering. Both fractions are thoroughly dried under mild conditions. Yield: 52 g. of $\alpha$-escin and 45 g. of $\beta$-escin.

*Example 2*

100 g. of the sodium salt of genuine escin are dissolved in 2 l. of water. The solution is stirred with 200 cc. of the above mentioned cation exchange agent for half an hour. The exchange agent is then filtered off and the solution is treated as described in the Example 1.

*Example 3*

100 g. of the sodium salt of genuine escin are converted, as described in Example 1, in aqueous-alcoholic solution into the acid form. The alcohol is distilled off in a vacuum and the resulting solution is allowed to stand at room temperature for a few days. Thereby, the water insoluble β-escin precipitates quantitatively.

The sodium salt of genuine escin used as starting material in the above given three examples is prepared in the following manner:

An ethereal solution of 1 kg. of cholesterol is added to 100 kg. of a 10% aqueous-alcoholic horse chestnut seed extract and the resulting emulsion is kept, while stirring, at 90° C. for one hour whereby the ether is distilled off. The water insoluble precipitate of cholesterol and saponin is centrifuged and washed with cold water until the wash water is colorless. The precipitate is air-dried at room temperature. The dust-fine powder is extracted in a Soxhlet apparatus with ether for 10 days. The residue is treated with 20 kg. of methanol and the resulting solution is filtered to remove the insoluble material. The yellowish solution is treated with activated charcoal until it is colorless. The methanol is evaporated in a vacuum and the residue is dried over phosphorus pentoxide at a vacuum of less than 1 mm./Hg. The yield of sodium salt of escin is about 8%.

α-Escin is a water soluble compound which contains one mole of xylose, one mole of glucose, and one mole of glucoronic acid. β-Escin is a water insoluble compound which also contains one mole of xylose, one mole of glucose, and one mole of glucoronic acid. Its hemolytic activity is higher than that of α-escin.

The time required for splitting up the genuine escin into the two isomers depends on the concentration of escin in the starting solution and more particularly on the cleavage temperature. A prolonged period of time, for instance, several days are required for splitting up the solution of genuine escin at a low temperature while a considerably shorter period of time is required at a relatively high temperature, for instance, at 80° C. Complete cleavage of a solution of 5% genuine escin at a temperature of 80° C. into α-escin and β-escin is achieved, for instance, after five minutes.

Strongly acid cation exchange agents are the preferred agents to convert the genuine escin, after dissolving it in water, into the free acid form.

We claim:

1. Substantially pure α-escin of the melting point 225–227° C., said α-escin being a white amorphous powder, having an optical rotation $[\alpha]_D^{25}$ of −13.5° (concentration: 5% in absolute methanol) and a hemolytic index of 1:20,000, being readily soluble in water and methanol, only slightly soluble in acetone, and insoluble in ether and hydrocarbons, its sodium salt having a melting point of 250–252° C., said α-escin containing one mole of xylose, one mole of glucose, and one mole of glucoronic acid.

2. Substantially pure β-escin of the melting point 222–223° C., said β-escin forming white, leaflet-like crystals, on recrystallisation from aqueous methanol, having an optical rotation $[\alpha]_D^{27}$ of −23.7° (concentration: 5% in absolute methanol) and a hemolytic index of 1:40,000, being readily soluble in methanol, slightly soluble in acetone, very little soluble in water, and insoluble in ether and hydrocarbons, the sodium salt of said β-escin having a melting point of 250–252° C., said β-escin containing one mole of xylose, one mole of glucose, and one mole of glucuronic acid.

3. In a process of producing two escin isomers from genuine horse chestnut escin, the steps which comprise contacting escin in an aqueous medium with a cation exchange agent to produce the free acid form thereof, heating its aqueous solution at a temperature between about 50° C. and about 90° C. until precipitation of β-escin is completed, separating the precipitated β-escin from the solution, and drying said β-escin under mild conditions.

4. The process according to claim 3, wherein the precipitation temperature is a temperature between about 60° C. and about 85° C.

5. The process according to claim 3, wherein the precipitation temperature is a temperature between about 65° C. and about 75° C.

6. In a process of producing two escin isomers from genuine horse chestnut escin, the steps which comprise dissolving escin in water, passing the aqueous solution through a column of a cation exchange agent to produce the free acid form of said escin, separating the exchange agent from the solution, heating the resulting aqueous solution of acid escin at a temperature between about 50° C. and about 90° C. until precipitation of β-escin is completed, separating the precipitated β-escin from the solution, and drying said β-escin under mild conditions.

7. In a process of producing two escin isomers from genuine horse chestnut escin, the steps which comprise agitating an aqueous solution of genuine escin with a cation exchange resin to produce the free acid form of said escin, separating the resin from the solution, heating the resulting aqueous solution of acid escin at a temperature between about 50° C. and about 90° C. until precipitation of β-escin is completed, separating the precipitated β-escin from the solution, and drying said β-escin under mild conditions.

8. In a process of producing two escin isomers from genuine horse chestnut escin, the steps which comprise contacting an aqueous-alcoholic solution of genuine escin with a cation exchange agent to produce the free acid form of said escin, separating the exchange agent from the solution, distilling off the alcohol from said solution, heating the resulting aqueous solution of acid escin at a temperature between about 50° C. and about 90° C. until precipitation of β-escin is completed, separating the precipitated β-escin from the solution, and drying said β-escin under mild conditions.

9. In a process of separating two escin isomers from genuine horse chestnut escin, the steps which comprise contacting escin in an aqueous medium with a cation exchange agent to produce the free acid form thereof, allowing an aqueous solution of the resulting acid escin to stand at room temperature until precipitation of β-escin is completed, and separating said precipitated β-escin from the solution containing the α-escin.

10. In a process of producing substantially pure α-escin from genuine horse chestnut escin, the steps which comprise contacting escin in an aqueous medium with a cation exchange agent to produce the free acid form thereof, heating its aqueous solution at a temperature between about 50° C. and about 90° C. until precipitation of β-escin is completed, separating the precipitated β-escin from the remaining solution, and evaporating the solution to dryness to yield α-escin.

11. The process according to claim 10, wherein the cation exchange agent is a cation exchange resin.

References Cited in the file of this patent

UNITED STATES PATENTS 2,790,793     Boedecker _____ Apr. 30, 1957

OTHER REFERENCES

Chem. Abst., vol. 48 (1954), 7849i.
Chem. Abst., vol. 52 (1958), 1368f.